United States Patent [19]

Sekiguchi

[11] Patent Number: 4,761,761

[45] Date of Patent: Aug. 2, 1988

[54] MULTITYPE CHARACTERS PROCESSING METHOD AND TERMINAL DEVICE WITH MULTIPLE DISPLAY BUFFERS

[75] Inventor: Hiroshi Sekiguchi, Nakano, Japan

[73] Assignee: Kanars Data Corporation, Tokyo, Japan

[21] Appl. No.: 809,744

[22] Filed: Dec. 17, 1985

Related U.S. Application Data

[63] Continuation-in-part of Ser. No. 657,772, Oct. 4, 1984, Pat. No. 4,727,511.

[30] Foreign Application Priority Data

Oct. 4, 1983 [JP] Japan .............................. 58-185514

[51] Int. Cl.⁴ .............................................. G06F 3/153
[52] U.S. Cl. .................................................... 364/900
[58] Field of Search ... 364/200 MS File, 900 MS File

[56] References Cited

U.S. PATENT DOCUMENTS 4,016,544  4/1977  Morita et al. .................. 364/900
4,274,146  6/1981  Yanagawa ...................... 364/710
4,641,262  2/1987  Bryan et al. .................... 364/900

Primary Examiner—Thomas M. Heckler
Attorney, Agent, or Firm—Bradford E. Kile

[57] ABSTRACT

A multitype characters processing method and terminal device is used to process code data representing characters belonging to any one of a plurality of character sets, there being characters common to each set. One of the sets is specified as the main set and the others are specified as subsets. Sequentially received data are stored in a first display buffer, and are then processed to determine whether they are common character code data. If they are common character code data, they are processed as the main set character code data; if they are not common character code data, they are processed by referring to a character set related to the data previously processed. Processed data results are stored in a second display buffer. In accordance with the invention, the operator may select either the first display buffer so as to display the received data or the second display buffer to display the processed data results.

10 Claims, 17 Drawing Sheets

Fig. 1

|   | 0 | 1 | 2 | 3 | 4 | 5 | 6 | 7 |
|---|---|---|---|---|---|---|---|---|
| 0 | NUL | (DLE)<br>TC7 | (SP) | 0 | @ | P | ` | p |
| 1 | (SOH)<br>TC1 | DC1 | ! | 1 | A | Q | a | q |
| 2 | (STX)<br>TC2 | DC2 | " | 2 | B | R | b | r |
| 3 | (ETX)<br>TC3 | DC3 | # | 3 | C | S | c | s |
| 4 | (EOT)<br>TC4 | DC4 | $ | 4 | D | T | d | t |
| 5 | (ENQ)<br>TC5 | (NAK)<br>TC8 | % | 5 | E | U | e | u |
| 6 | (ACK)<br>TC6 | (SYN)<br>TC9 | & | 6 | F | V | f | v |
| 7 | BEL | (ETB)<br>TC10 | ▼ | 7 | G | W | g | w |
| 8 | (BS)<br>FE0 | CAN | ( | 8 | H | X | h | x |
| 9 | (HT)<br>FE1 | EM | ) | 9 | I | Y | i | y |
| A | (LF)<br>FE2 | SUB | ∗ | : | J | Z | j | z |
| B | (VT)<br>FE | ESC | + | ; | K | [ | k | { |
| C | (FF)<br>FE4 | (FS)<br>IS4 | , | < | L | \ | l | \| |
| D | (CR)<br>FE3 | (GS)<br>IS3 | — | = | M | ] | m | } |
| E | SO | (RS)<br>IS2 | • | > | N | ^ | n | ~ |
| F | SI | (US)<br>IS1 | / | ? | O | — | o | DEL |

Fig. 2

```
   :  ウィンドウのルーチンでは 3 つのプロセスをおこなう。
   ; (1) COUNTER 1 へ「INPUT」をかぞえをにす。
   ; (2) COUNTER 2 から 1 をひく。
   ; (3) BUF 7 に「アラーム」とセット する。
   また、P30 のルーチンでは COUNTER 3 を
   COUNTER 2 のかわりに インクリメントするとともに、
   またこのに かえるように チェックする ビットを たてる。
```

|  |  | \multicolumn{8}{c}{b5 b6 b7} |
| --- | --- | --- | --- | --- | --- | --- | --- | --- | --- |
|  |  | 0 | 1 | 2 | 3 | 4 | 5 | 6 | 7 |
|  | 0 | NUL | (DEL) TC7 | SPACE | 0 | @ | P | ` | p |
|  | 1 | (SOH) TC1 | DC1 | ! | 1 | A | Q | a | q |
|  | 2 | (STX) TC2 | DC2 | '' | 2 | B | R | b | r |
|  | 3 | (ETX) TC3 | DC3 | # | 3 | C | S | c | s |
|  | 4 | (EOT) TC4 | DC4 | $ | 4 | D | T | d | t |
|  | 5 | (ENQ) TC5 | (NAK) TC8 | % | 5 | E | U | e | u |
| b1 | 6 | (AOK) TC6 | (SYN) TC9 | & | 6 | F | V | f | v |
| b2 | 7 | BEL | (ETB) TC10 | ' | 7 | G | W | g | w |
| b3 | 8 | (BS) FE0 | CAN | ( | 8 | H | X | h | x |
| b4 | 9 | (HT) FE1 | EM | ) | 9 | I | Y | i | y |
|  | A | (LF) FE2 | SUB | * | : | J | Z | j | z |
|  | B | (VT) FE3 | ESC | + | ; | K | [ | k | { |
|  | C | (FF) FE4 | (FS) IS4 | , | < | L | \ | l | XH |
|  | D | (CR) FE5 | (GS) IS3 | − | = | M | ] | m | } |
|  | E | SO | (RS) IS2 | . | > | N | ∧ | n | XK |
|  | F | SI | (US) IS1 | / | ? | O | _ | o | DEL |

Fig. 8

|  |  | \multicolumn{8}{c}{b5 b6 b7} |
| --- | --- | --- | --- | --- | --- | --- | --- | --- | --- |
|  |  | 0 | 1 | 2 | 3 | 4 | 5 | 6 | 7 |
|  | 0 | NUL | (DLE) TC7 | SPACE | 〃 | @ | た | ﾞ | よ |
|  | 1 | (SOH) TC1 | DC1 | ! | ° | う | ち | は | ら |
|  | 2 | (STX) TC2 | DC2 | 〟 | ─ | え | つ | ひ | り |
|  | 3 | (ETX) TC3 | DC3 | # | ・ | ぇ | っ | ふ | る |
|  | 4 | (EOT) TC4 | DC4 | $ | ~ | お | て | へ | れ |
|  | 5 | (ENQ) TC5 | (NAK) TC8 | % | あ | ォ | と | ほ | ろ |
| b1 | 6 | (ACK) TC6 | (SYN) TC9 | & | ｱ | か | な | ま | わ |
| b2 | 7 | BEL | (ETB) TC10 | ' | い | き | に | み | を |
| b3 | 8 | (BS) FE0 | CAN | ( | ｲ | く | ぬ | む | ん |
| b4 | 9 | (HT) FE1 | EM | ) | う | け | ね | め | ┌ |
|  | A | (LF) FE2 | SUB | * | : | こ | の | も | ┘ |
|  | B | (VT) FE3 | ESC | + | ; | さ | [ | や | { |
|  | C | (FF) FE4 | (FS) IS4 | , | < | し | \ | ゃ | XH |
|  | D | (CR) FE5 | (GS) IS3 | ─ | = | す | ] | ゆ | } |
|  | E | SO | (RS) IS2 | . | > | せ | ∧ | ゅ | XK |
|  | F | SI | (US) IS1 | / | ? | そ | _ | よ | DEL |

Fig. 9

|   | | 0 | 1 | 2 | 3 | 4 | 5 | 6 | 7 |
|---|---|---|---|---|---|---|---|---|---|
|   | | | | | | | | b5 b6 b7 | |
|   | 0 | NUL | (DLE) TC7 | SPACE | " | @ | タ | ＇ | ヨ |
|   | 1 | (SOH) TC1 | DC1 | ! | ° | ゥ | チ | ハ | ラ |
|   | 2 | (STX) TC2 | DC2 | " | ー | エ | ツ | ヒ | リ |
|   | 3 | (ETX) TC3 | DC3 | # | ・ | ェ | ッ | フ | ル |
|   | 4 | (EOT) TC4 | DC4 | $ | ～ | オ | テ | ヘ | レ |
|   | 5 | (ENQ) TC5 | (NAK) TC8 | % | ア | ォ | ト | ホ | ロ |
| b1 | 6 | (ACK) TC6 | (SYN) TC9 | & | ァ | カ | ナ | マ | ワ |
| b2 | 7 | BEL | (ETB) TC10 | ' | イ | キ | ニ | ミ | ヲ |
| b3 | 8 | (BS) FE0 | CAN | ( | ィ | ク | ヌ | ム | ン |
| b4 | 9 | (HT) FE1 | EM | ) | ウ | ケ | ネ | メ | ┌ |
|   | A | (LF) FE2 | SUB | * | : | コ | ノ | モ | ┘ |
|   | B | (VT) FE3 | ESC | + | ; | サ | [ | ヤ | { |
|   | C | (FF) FE4 | (FS) IS4 | , | < | シ | \ | ャ | XH |
|   | D | (CR) FE5 | (GS) IS3 | - | = | ス | ] | ユ | } |
|   | E | SO | (RS) IS2 | . | > | セ | ∧ | ュ | XK |
|   | F | SI | (US) IS1 | / | ? | ソ | _ | ヨ | DEL |

Fig. 10

| | 0 | 1 | 2 | 3 | 4 | 5 | 6 | 7 |
|---|---|---|---|---|---|---|---|---|
| 0 | NUL | (DLE) TC7 | SPACE | | @ | | ` | |
| 1 | (SOH) TC1 | DC1 | ! | | | | | |
| 2 | (STX) TC2 | DC2 | " | | | | | |
| 3 | (ETX) TC3 | DC3 | # | | | | | |
| 4 | (EOT) TC4 | DC4 | $ | | | | | |
| 5 | (ENQ) TC5 | (NAC) TC8 | % | | | | | |
| 6 | (ACK) TC6 | (SYN) TC9 | & | | | | | |
| 7 | BEL | (ETB) TC10 | ' | | | | | |
| 8 | (BS) FE0 | CAN | ( | | | | | |
| 9 | (HT) FE1 | EM | ) | | | | | |
| A | (LF) FE2 | SUB | * | : | | | | |
| B | (VT) FE3 | ESC | + | ; | | [ | | { |
| C | (FF) FE4 | (FS) IS4 | , | < | | \ | | |
| D | (CR) FE5 | (GS) IS3 | — | = | | ] | | } |
| E | SO | (RS) IS2 | . | > | | ^ | | |
| F | SI | (US) IS1 | / | ? | | _ | | DEL |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NUL | DLE | (SP) | 0 | @ | P | ` | p |   |   |   | ― | た | み |   |   |
| 1 | SOH | DC1 | ! | 1 | A | Q | a | q |   |   | XK | あ | ち | む |   |   |
| 2 | STX | DC2 | " | 2 | B | R | b | r |   |   | ┌ | い | つ | め |   |   |
| 3 | ETX | DC3 | # | 3 | C | S | c | s |   |   | ┘ | う | て | も |   |   |
| 4 | EOT | DC4 | $ | 4 | D | T | d | t |   |   | ～ | え | と | や |   |   |
| 5 | ENQ | NAK | % | 5 | E | U | e | u |   |   | ・ | お | な | ゆ |   |   |
| 6 | ACK | SYN | & | 6 | F | V | f | v |   |   | を | か | に | よ |   |   |
| 7 | BEL | ETB | ' | 7 | G | W | g | w |   |   | ア | き | ぬ | ら |   |   |
| 8 | BS | CAN | ( | 8 | H | X | h | x |   |   | イ | く | ね | り |   |   |
| 9 | HT | EM | ) | 9 | I | Y | i | y |   |   | ウ | け | の | る |   |   |
| A | LF | SUB | * | : | J | Z | j | z |   |   | エ | こ | は | れ |   |   |
| B | VT | ESC | + | ; | K | [ | k | { |   |   | オ | さ | ひ | ろ |   |   |
| C | FF | FS | , | < | L | ¥ | l | \| |   |   | ャ | し | ふ | わ |   |   |
| D | CR | GS | ― | = | M | ] | m | } |   |   | ュ | す | へ | ん |   |   |
| E | SO | RS | . | > | N | ^ | n | ￣ |   |   | ョ | せ | ほ | ゛ |   |   |
| F | SI | US | / | ? | O | _ | o | DEL |   |   | ッ | そ | ま | ゜ |   |   |

Fig. 16

; THE NEXT ROUTINE PROCESSES THE FOLLOWING 3 PROCEDURES.

; (1) STORE THE INPUT DATA TO COUNTER 1.

; (2) SUB 1 FROM COUNTER 2.

; (3) SET "ALARM" INTO BUF 7.

; IT IS NECESSARY TO PAY ATTENTION TO THE PREVIOUS.

; ROUTINE(P30) IN WHICH COUNTER 3 IS USED INSTEAD OF COUNTER 2.

MULTITYPE CHARACTERS PROCESSING METHOD AND TERMINAL DEVICE WITH MULTIPLE DISPLAY BUFFERS

REFERENCE TO RELATED APPLICATION

This is a continuation-in-part (CIP) of Ser. No. 657,772 filed on Oct. 4, 1984, now U.S. Pat. No. 4,727,511.

TECHNICAL FIELD

This invention relates to a multitype characters processing method and terminal device used to input and output various character data derived from a plurality of character sets. More particularly, the invention relates to a multitype characters processing method and terminal device having multiple display buffers to facilitate operator awareness of code data received and not yet processed vis-a-vis data results resulting from processing of the received code data.

BACKGROUND ART

In general, computers and people come into contact with each other through a keyboard/display unit. Thus, whether it is easy to handle the keyboard/display unit will greatly affect the efficiency of the work.

Recently, there have appeared advanced terminal devices with which processing of Japanese characters including Kanji characters (Chinese characters) is possible. With these terminals, the computer input/output of data consisting of Japanese characters is much easier. There are still, however, some weak points in processing data of Japanese Kanji characters. First, there are too many characters to be entered efficiently by key operation. These characters cannot be entered as easily as Latin or English alphabetic characters are entered.

Second, a worldwide common code system consisting of the same number of bits is not in use, since Kanji characters require a 2-byte (16 bit) code system, while 7-bit code systems (e.g. ASCII code) have been adopted for computers used in almost all nations in the world with, for example, the characters of the Latin or English alphabet. This prevents smooth communication of data processing information between Japan and foreign countries.

An 8-bit code system JIS C 6220, created on the basis of the ASCII code, is available. It is, however, impossible to encode a 7-bit software code for JIS C 6220 without modification. Furthermore, since JIS C 6220 is based on Katakana characters, documents output through this code are very difficult to read, and many readers of those Katakana documents complain about this difficulty.

Texts consisting of a Latin or English alphabet, in combination with Hiragana and Katakana characters, present special problems. The readability of such documents has been studied. In a text, for example, consisting mainly of Hiragana characters, it may be read as if it were normal Japanese writing with spaces inserted between words. In conventional systems, however, a code of many bits is required if the three types of character sets are used, even though the number of bits used for writing would be less than the case in which Kanji characters are used.

There are still some other systems in which many characters are represented by codes consisting of fewer bits, and shift codes are set in advance in the control code. For example, in the ASCII code, the hexadecimal numbers "0E" and "0F" correspond to SO (shift out) and SI (shift in), respectively, and the succeeding character sets are selected by these control codes (SO/SI), for example, upper/lower cases.

In a text in which Latin or English characters, Hiragana characters and Katakana characters are mixed and frequently change, the following problems occur:

(1) The shift system is merely used to change character sets. Thus, it is impossible to judge what character set is used to represent the word by simply checking the word code system after it has switched over. In some cases, the determination may not be made before thousands of characters have been traced back to check the SI or SO.

(2) If three types of characters are used in this system, three change-over codes must be set. In this case, problem (1) above may be worsened. It becomes almost impossible to use the code.

(3) In programs created mainly by the ASCII code, SI and SO are often used for purposes other than selection of graphic symbols, etc. Thus SI and SO, if used for changing between Hiragana and Katakana characters, cannot retain compatibility with conventional programs.

In actuality, they are rarely used because of these problems.

A recently developed shift system used in data processing of Japanese characters, including Kanji characters, has come into use. It is an extension of the above shift code system and has the same basic concept as the above SI and SO system, having the same problems as (1), (2) and (3) listed above.

DISCLOSURE OF INVENTION

The purpose of this invention is to provide a multitype characters processing method and terminal device, in which, a code system consisting of a minimum number of bits can be used for processing data consisting of a plurality of character types, and more particularly to provide such a method and terminal device employing multiple display buffers to provide the operator with the capability of displaying, on a selective basis, the code data received prior to processing or the data results resulting from processing of the received code data.

The invention basically comprises determining means, specifying register means and processing means. One of the plurality of character sets is designated the main character set. The determining means is used to determine whether the data is a character code common to the plurality of character sets, or whether it is specifying one of the subcharacter sets or a character code not common to each set. The specifying register means is used, when the result of the above determination indicates common character code data, to store data specifying a set related to the previously processed data. If the result of the above determination indicates common character code data, the data is processed as the main character set; otherwise, the data is processed by referring to the contents of the specifying register means. Thus, a given character code data is converted to data consisting of specified bits.

A preferred embodiment of the invention includes multiple display buffers, specifically a first display buffer for storing received code data prior to processing of such code data, and a second display buffer for storing data results derived from processing of the received code data.

Further objects and advantages of this invention, operational effects and detailed information will become clearer by reference to the following detailed description, the accompanying claims, and the annexed drawings.

BRIEF DESCRIPTION OF DRAWINGS

FIG. 1 depicts the ASCII code system;

FIG. 2 depicts a text written in English, Hiraganas and Katakanas;

FIG. 6 is a table showing the correspondence of characters/codes for an encoder or decoder in accordance with the invention;

FIG. 7 is a table showing the code system of the English alphabetic character set;

FIG. 8 is a table showing the code system of the Hiragana character set;

FIG. 9 is a table showing the code system of the Katakana character set;

FIG. 10 is a table showing the common part of the code systems shown in FIGS. 7 thru 9;

FIG. 14A depicts an example in which the text on the first line shown in FIG. 2 is converted by this invention;

FIG. 14B depicts an example in which the text on the first line shown in FIG. 2 is converted using only the alphabetic set;

FIG. 14C depicts an example in which codes, corresponding to the text of FIG. 14A as transmitted from the host computer, are represented by hexadecimal numbers;

FIG. 15 is a table of the Katakana character part of the JIS C 6220 code rewritten into Hiragana characters;

FIG. 16 depicts the text of FIG. 2 represented by alphabetic characters; and

DESCRIPTION OF A PREFERRED EMBODIMENT

Figure 3:
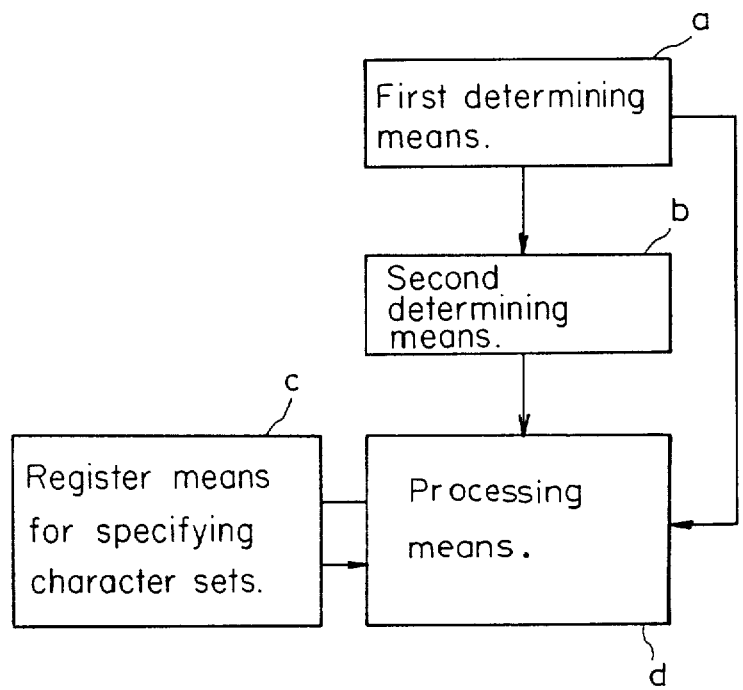
FIG. 3 is an overall block diagram of this invention.

FIG. 3 is a block diagram of the present invention. The first determining means (a) is used to determine whether a given data is specified common character code data. See FIG. 10 which shows the characters common to the Hiragana, Katakana and English character sets. The second determining means (b) is used, when the first determining means (a) determines that the given data is not the specified common character code, to determine whether the given data is data specifying one of the subsets or whether it is character code data not common to each of the character sets. One of the sets of character codes will be designated the main set. In a preferred embodiment of the invention, the English characters are designated the main set. The other character sets, for example, the Hiragana and Katakana sets, are designated subsets.

The character set specifying register means (c) is used to designate a character set by storing data used to specify one of the character sets. The processing means (d) is used, when the above given data is determined to be the specified common character data, to rewrite the contents of the character set specifying register means to data specifying the main set, as well as to process the above given data as the main set character code data. When the second determining means (b) determines that the above given data is data used to specify one of the subsets, the contents of the character set specifying register means (c) are rewritten to data used to specify the pertinent subset, and when the second determining means (b) determines that the above given data is character code data not common to each character set, the above given data is processed by referring to the contents of the character set specifying register means (c).

Figure 4:
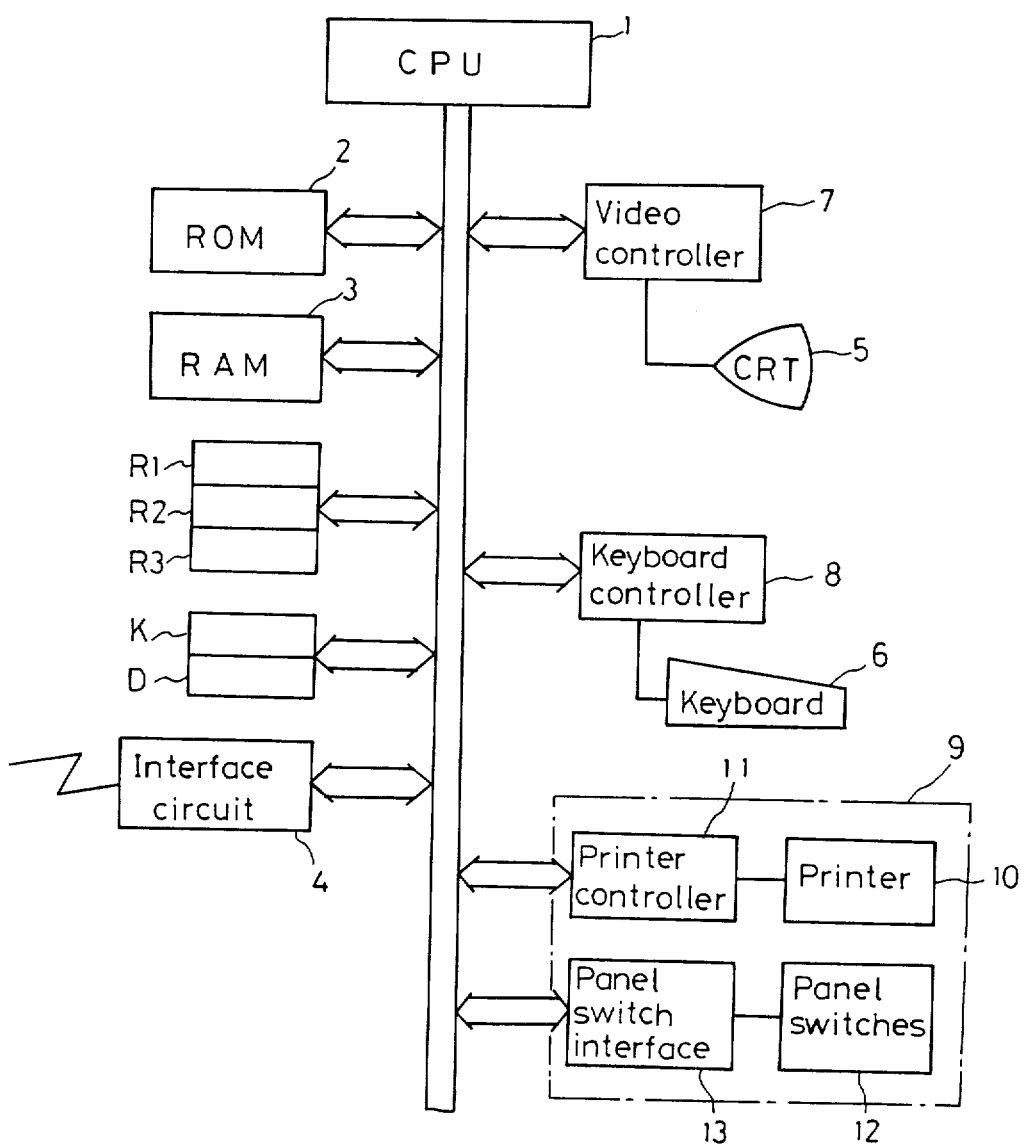
FIG. 4 is a block diagram of a system for the implementation of this invention.

Next, a detailed example of the operation of this invention will be explained. FIG. 4 is a block diagram of the multitype characters processing terminal device according to this invention. Reference numeral 1 designates a CPU controlling the entire device via a CPU bus 14. Read-only memory (ROM) 2 is exclusively used for reading data, and it stores control programs of CPU 1, etc. Random access memory (RAM) 3 is used for both reading and writing data. RAM 3 is used to store data needed temporarily. R1, R2 and R3 are code registers in which codes to be entered into this device are stored temporarily. K and D are specifying registers in which data used to specify one of the character sets is stored. Registers R1, R2, R3 K and D may be allocated to addresses in RAM 3. Interface circuit 4 is used to receive/send data from/to the host computer (not shown). A display is provided by CRT 5 while data is entered via keyboard 6. Video controller 7 and a keyboard controller 8 are coupled to the CRT 5 and keyboard 6, respectively. The video controller 7 is a circuit used to control CRT 5, and the keyboard controller 8 is a circuit used to receive signal output from the keyboard 6 and to send it to the CPU 1.

Figure 5:
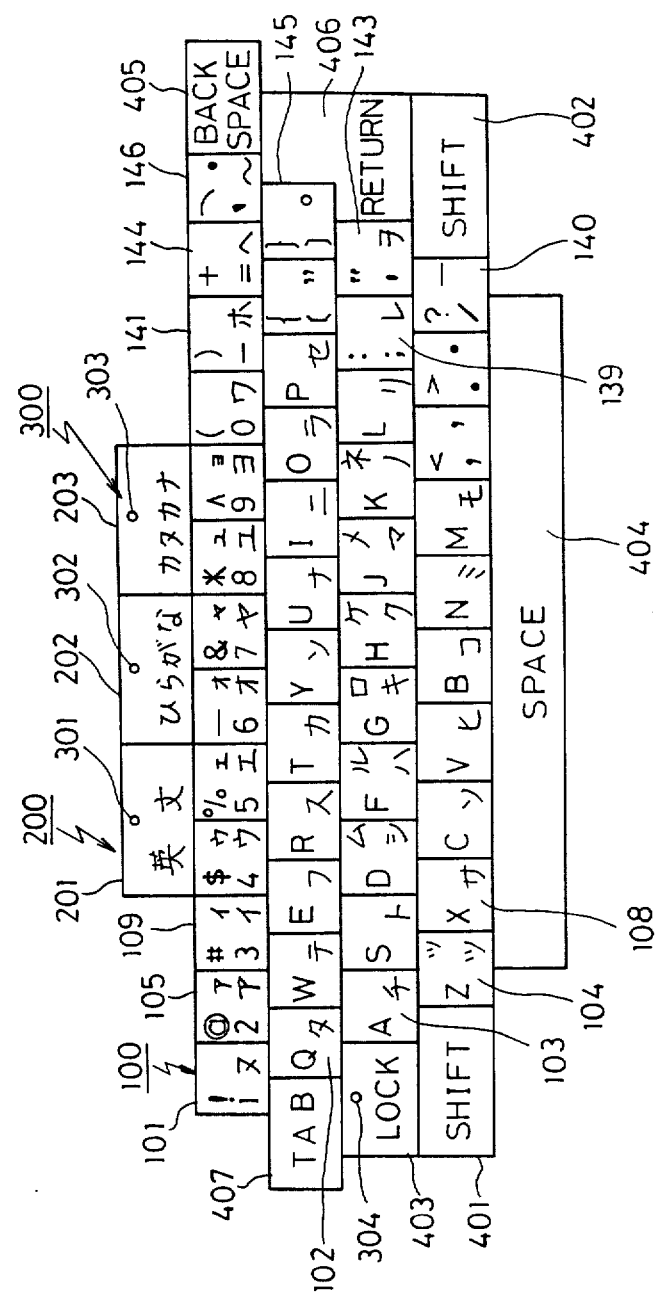
FIG. 5 is a layout diagram of keys of the keyboard shown in FIG. 4.

FIG. 5 shows the layout of keys of the keyboard 6, and includes character/numeric keys 100, consisting of 46 keys (101 to 146). Character set select keys 200 consisting of keys 201, 202 and 203 are used to select English, Hiragana and Katakana characters, respectively. Indicator lamps 300 are used to indicate the selection of the character set select keys 200, the lamps 300 consisting of lamps 301, 302 and 303. Shift keys 401 and 402 activate the shift function. A lock key is at 403 and a space key is at 404, a back space key at 405, a return key at 406, and a TAB key at 407.

The lamp 304 is lit when the shift keys 401, 402 or the lock key 403 perform a specified operation.

The keyboard 6 shown in this example has the character set select keys 200. If keys 101 to 146 are pressed when the alphabetic set is selected, English characters are encoded and provided as an output via the keyboard controller 8 (FIG. 4) in the same way as when a normal English character keyboard is used (this keyboard is further described in Japanese patent application No. 54-85981).

Figure 6:
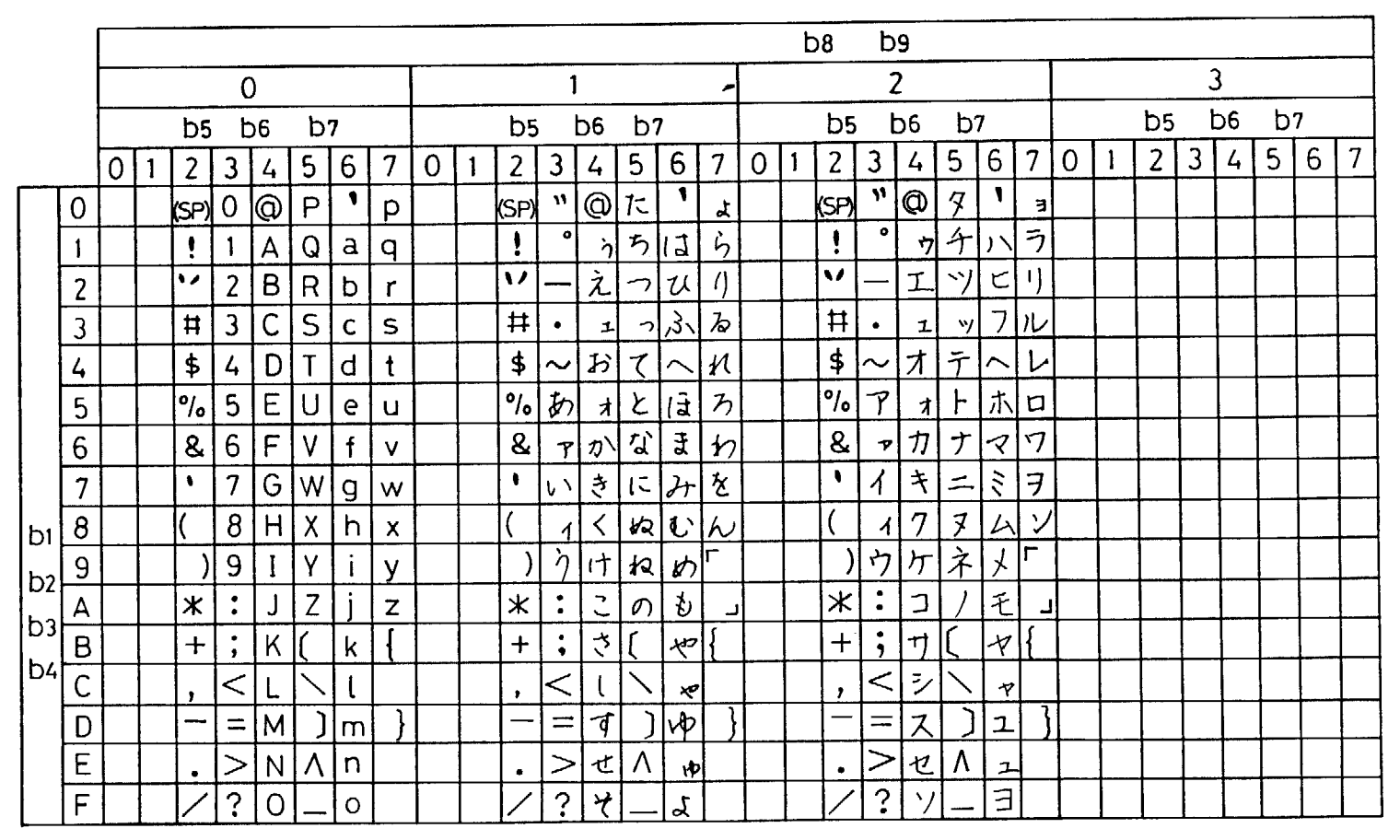

FIG. 6 is a table showing the character/code correspondence used for encoding except for the control code. As shown in this table, the upper two bits of two 9-bit character codes specify a character set. When the upper two bits are "00", English characters are selected, when they are "01", Hiragana characters are selected, and when they are "10", Katakana characters are selected. ("11" is undefined). This character/code correspondence table can also be used when the CPU 1 (FIG. 4) controls the video controller 7 to create character patterns using the character generator. FIGS. 7 thru 9 are tables showing each character set code system including control characters. FIG. 7 shows the English set, while FIG. 8 shows the Hiragana set, and FIG. 9 shows the Katakana set. FIG. 1 shows the standard ASCII code for comparison. In this example, the English set is used as the main character set, and others are used as subsets. Characters enclosed in thick frames in each figure are common to each character set, and these common characters are shown in the table of FIG. 10. "XH" of the common characters ("7C" in hexadecimal code) is used as a code specifying Hiraganas, and "XK" ("7E" in hexadecimal code) is used as a code specifying Katakanas. Portion 9 (enclosed with a dotted line) of the system of FIG. 4 is provided for printing characters, which are printed out corresponding to the character codes sent out from the host computer or the keyboard 6. Block 10 is a printer, 11 is a printer controller, 12 is a group of panel switches, and 13 is a panel switch interface.

Figure 11:
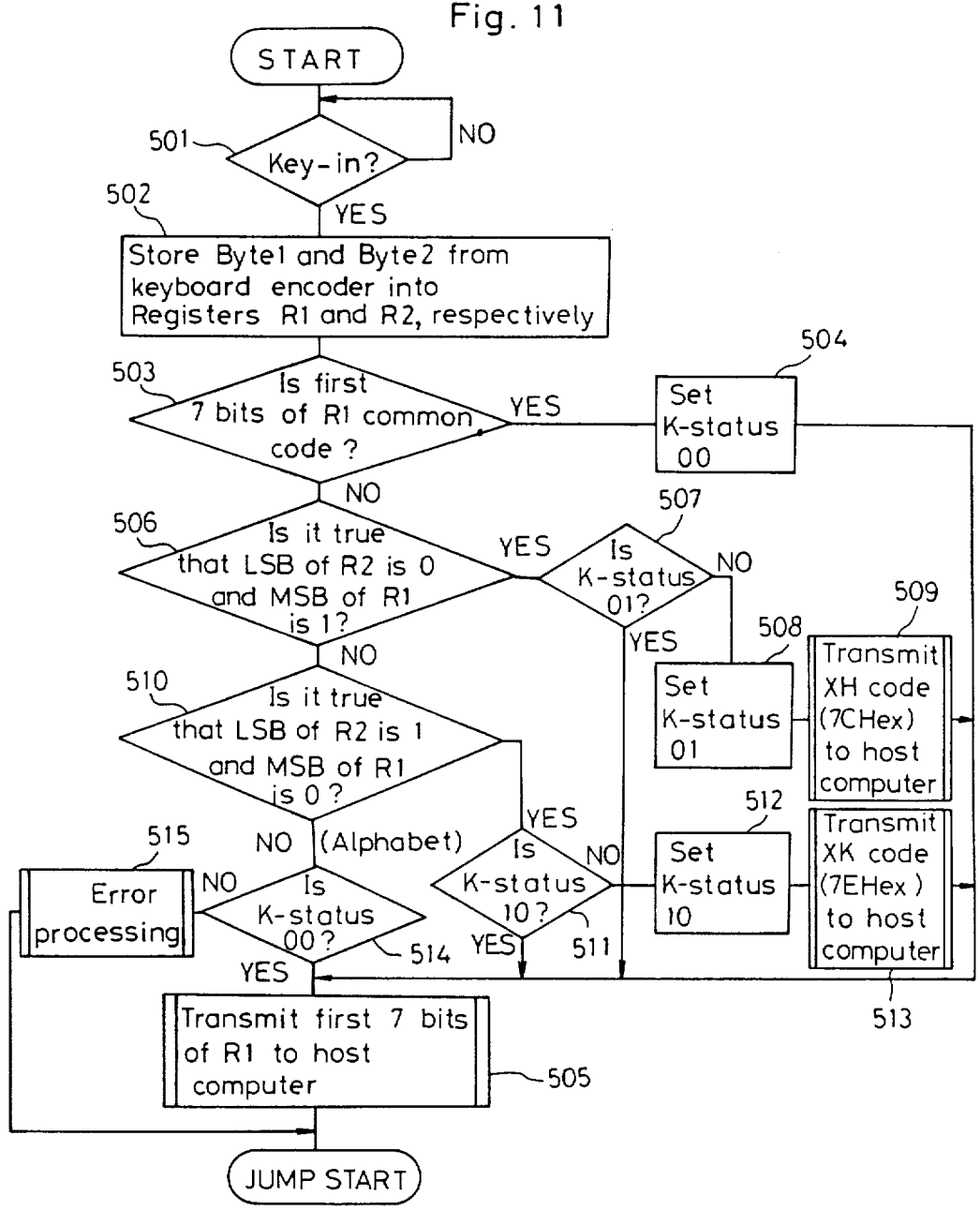
FIG. 11 is a flow chart depicting the operations performed in accordance with this invention when character data is entered into a keyboard for transmission to a host computer.
Figure 12:
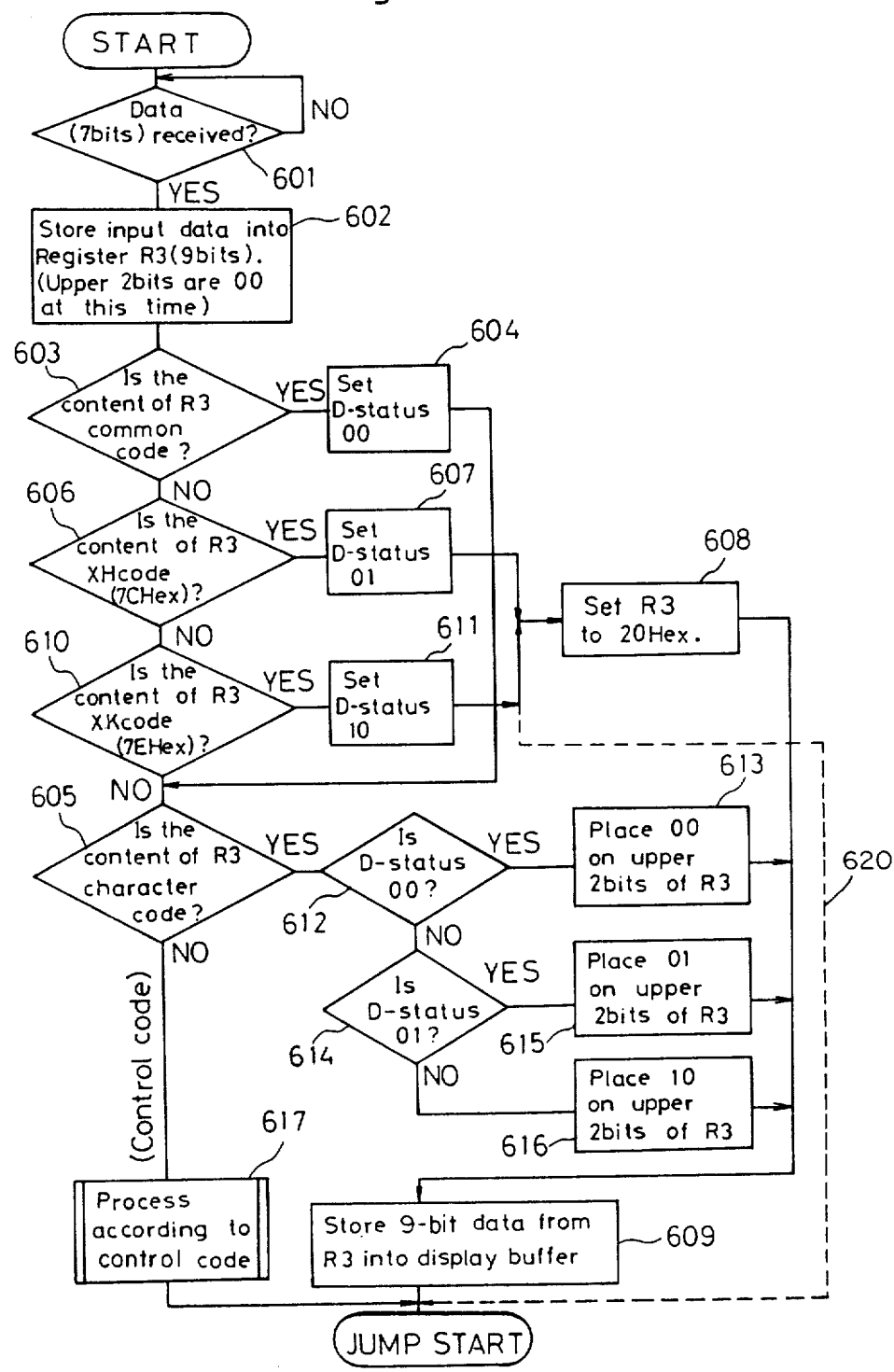
FIG. 12 is a flow chart depicting the operations performed in accordance with this invention when character codes sent from a host computer to a keyboard are processed.

The operation of CPU 1 is in accordance with the flow charts of FIGS. 11 and 12. Referring now to the flow charts of FIGS. 11 and 12, first, the transmission of character data entered from the keyboard 6 and sent out to the host computer will be explained.

Figure 13A:
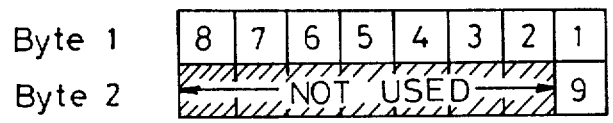
FIG. 13A is a diagram of a 9-bit code transmission format output from the keyboard encoder in accordance with the invention.
Figure 13B:
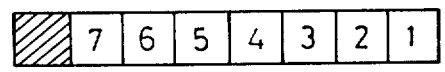
FIG. 13B is a diagram of a 7-bit transmission format.

A character entered from keyboard 6 (FIG. 11 - block 501), as shown in FIG. 4, is converted to 9-bit code data (hereafter referred to as "code") of which the upper two bits indicate a particular character set and the lower 7 bits indicate a character in the particular character set. Since this code consists of 9 bits, it becomes 2 bytes when it is output from the keyboard controller 8 as shown in FIG. 13A (usually, the ASCII code consists of 7 bits, so it is 1 byte as shown in FIG. 13B). That is, the lower 8 bits are output as one byte, then the upper 1 bit is output as the lowest bit of the next byte. This type of processing is performed because the data within a computer flows in units of 1 byte (8 bits).

The CPU 1 fetches each byte of data output from the keyboard 6 at the next step 502 and stores each byte in registers R1 and R2 when it concludes, at the step 501 shown in FIG. 11, that data is being entered. Then, the CPU 1 advances to the step 503, and determines whether the lower 7 bit code in the register R1 is one of the common codes (based on FIG. 10). In this case, XH and XK are not included in the common codes as shown in FIG. 10 because they are special codes. When the CPU 1 concludes, at step 503, that they are the common codes, it branches to step 504 to set the contents of the register K to "00", designating the English characters set (hereafter referred to as K status set to "00"). The program then advances to step 505 to transmit the lower 7-bit code stored in the register R1 to the external host computer and then returns to the start.

The CPU 1 advances to step 506 when it concludes that the code is not a common code, and there determines whether the lowest bit in the register R2 is "0" and the highest bit in the register R1 is "1", that is, whether it is the Hiragana set. If YES, CPU 1 advances to step 507, and there determines whether the K status is "01". If NO, it sets the K status to "01" at step 508, designating the Hiragana set, transmits "XH" code (hexadecimal "7C") to an external host computer at step 509, and then transmits the lower 7-bit code to the host computer at step 505. CPU 1 advances directly to step 505 if the result at step 507 is YES. CPU 1 then transmits the lower 7 bits in the register R1 to the host computer and then returns to the start.

CPU 1 advances to step 510 if the result at step 506 is NO, and determines whether the lowest bit in the register R2 is "1" and the highest bit in the register R1 is "0", that is, whether it is the Katakana set. If the result is YES, CPU 1 advances to step 511. CPU 1 determines at step 511 whether the K status is "10", and if the result is NO, it sets the K status to "10", designating the Katakana set, and transmits "XK" code (hexadecimal "7E") to the host computer at step 513. It then transmits the lower 7-bit code in the register R1 to the host computer at step 505 before returning to the start.

CPU 1 advances directly to step 505 if the result at step 511 is YES, and there it transmits the lower 7-bit code in the register R1 to the host computer and then returns to the start.

CPU 1 advances to step 514 if the result at step 510 is NO (that is, only English set characters are extracted here). There, CPU 1 determines whether the K status is "00". If the result is YES, the CPU 1 advances to step 505 to transmit the lower 7-bit code in the register R1 to the host computer, and then returns to the start.

CPU 1 performs error processing at step 515 if the result at step 514 is NO. In this case, CPU 1 assumes that the code does not belong to any character set. CPU 1 then returns to the start without transmitting any code. The contents of the error processing have no meaning to this invention, so explanation for that is omitted here.

Figures 14A, 14B, 14C:
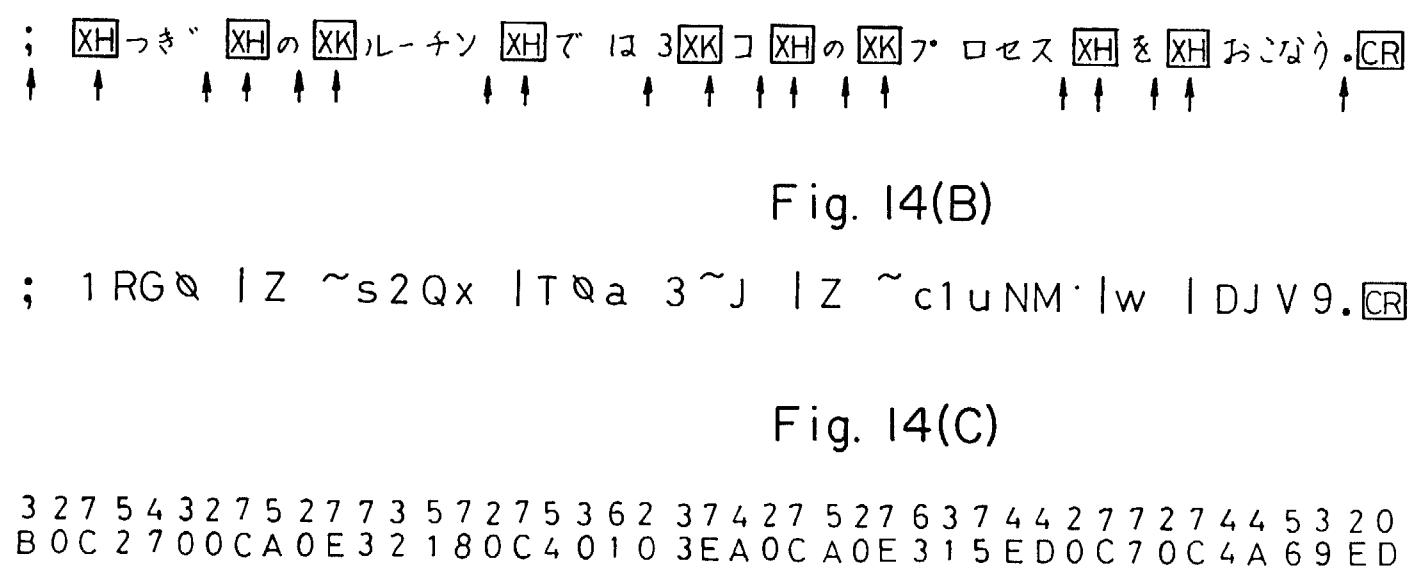

As an example, if the text on the first line shown in FIG. 2 is keyed into this device, codes corresponding to the characters shown in FIG. 14A, showing mixed English, Hiragana and Katakana text, are transmitted to the host computer. The character set of characters, indicated by an arrow in the figure, are then to be converted. FIG. 14B shows how the same code data are represented by genuine ASCII characters only. That is, the first character of the words of subsets are preceded by "XH" or "XK" specifying each respective character set. Thus, according to this invention, characters keyed in from the keyboard 6 and represented by 9 bits when converted to codes are converted to 7-bit codes prior to being transmitted to the host computer.

Next, operation according to FIG. 12 is described, in which operation each 7-bit code is converted to a character when character data of the above format entered into the host computer is transmitted from the host computer (echoed back for example), or when it is transferred by a host computer program.

CPU 1, if it concludes at step 601 that there is an input code, stores this code in the register R3 at step 602, and then determines at step 603 whether the R3 contents are common codes (in this case, special codes "XH" and "XK" are not included in the common codes). If the results is YES, CPU 1 sets the register D content to "00" at step 604 (hereafter referred to as D status is set of "00"), and advances to step 605 to determine whether the register R3 content is a character code (i.e., whether it is not a control code). If the result at step 603 is NO, the CPU 1 advances to step 606 to determine whether the register R3 content is "XH". If the result is YES, it advances to step 607, sets the D status to "01", and sets the register R3 content to "SP" (space) at step 608, namely, hexadecimal "20". It then advances to step 609, where it adds a 2-bit code indicated by the D status to the 7-bit code and stores the result into a display buffer (usually contained in the video controller 7 or RAM 3 of FIG. 4) as a 9-bit code, and then returns to the start.

The process of displaying the 9-bit code stored in the display buffer on the CRT 5 is omitted here because it is the same as the general method used for a normal character display unit. However, note that the character generator used in this case has the same character/code correspondence as that shown in FIG. 6.

CPU 1 advances to step 610 if the result at step 606 is NO, and there it determines whether the register R3 content is "XK". If the result is YES, the CPU 1 sets the D status to "10" at step 611, sets the register R3 content to "SP" at step 608, and then processes in the same way as stated above at step 609, after which it returns to the start. As shown above, because "XH" and "XK" are not characters, but rather codes used to specify a character set for the succeeding characters, the register R3 content is set to "SP" at step 608.

Therefore, as shown by the dotted line 620 in FIG. 12, CPU 1 may return to the start immediately after steps 607 and 611. If the register R3 content is set to "SP", a space is displayed on the CRT. Thus, the existence of an XH or XK code is indicated. If the register R3 content is not set to "SP", namely steps 608 and 609 are skipped, no change is displayed on the CRT or no space is displayed. Thus, in the latter case, it is easier to read characters on the CRT because unnecessary spaces are eliminated.

Also, a problem may arise from the difference between the number of displayed characters and the number of codes in memory. In this case, the former method can be selected. It is much more convenient if either of the two methods can be selected freely by the operator. FIG. 2 shows an example of a display in which neither XH nor XK is displayed as a space. CPU 1 advances to step 612 if the result at step 605 is YES. There, CPU 1 determines whether the D status is "00" (i.e., whether the D status indicates the main set). If the result is YES, it advances to step 613 to add a "00" code to the upper bit side of the register R3 code. Then, CPU 1 stores the result in the display buffer as a 9-bit code at step 709, and returns to the start.

CPU 1 advances to step 614 if the result at step 612 is NO, and it determines whether the D status is "01" (i.e., whether the D status indicates the Hiragana set). If YES, CPU 1 adds a "01" code to the upper bit side of the register R3 at step 615, then stores the result in the display buffer as a 9-bit code at step 609, and returns to the start.

CPU 1 advances to step 616 if the result at step 614 is NO (at this time, it is assumed that the D status indicates the Katakana set). There, the CPU 1 adds a "10" code to the upper bit side of the register R3, stores the result in the display buffer as a 9-bit code at step 609, and returns to the start.

CPU 1 advances to step 617 if the result at step 605 is NO, indicating that the content in the register R3 is a control code. CPU 1 performs processing according to the control code at step 617.

The method of displaying the 9-bit code stored in the display buffer on the CRT is the same as described above.

If a 7-bit code shown in FIG. 14C, as represented by two (top and bottom) hexadecimal numbers in a character code, the top digit being equal to the upper 3 bits, and the bottom digit being equal to the following 4 bits, is entered sequentially from the host computer to the device, distinction may be made among the English, Hiragana and Katakana characters based on the code (7C or 7E in hexadecimal) being equal to "XH" or "XK" as shown in the first line in FIG. 2, and the same text as entered is displayed on the screen of CRT 5 (FIG. 4).

According to the present invention, the latter processes are executed each time a code datum comes in, and it is not necessary for the timing of the process to be synchronized to the time of code datum input. Namely, it is preferred that a received string of input codes be stored into a first display buffer; then, each code stored in the first display buffer is processed according to the above-mentioned protocol of FIG. 12, the results of processing being stored in a second display buffer. As in the case of a "single display buffer" arrangement previously discussed, the first and second display buffers are provided (as is the usual case) in the video controller 7 of FIG. 4 or in the RAM 3 of FIG. 4.

Figure 17:
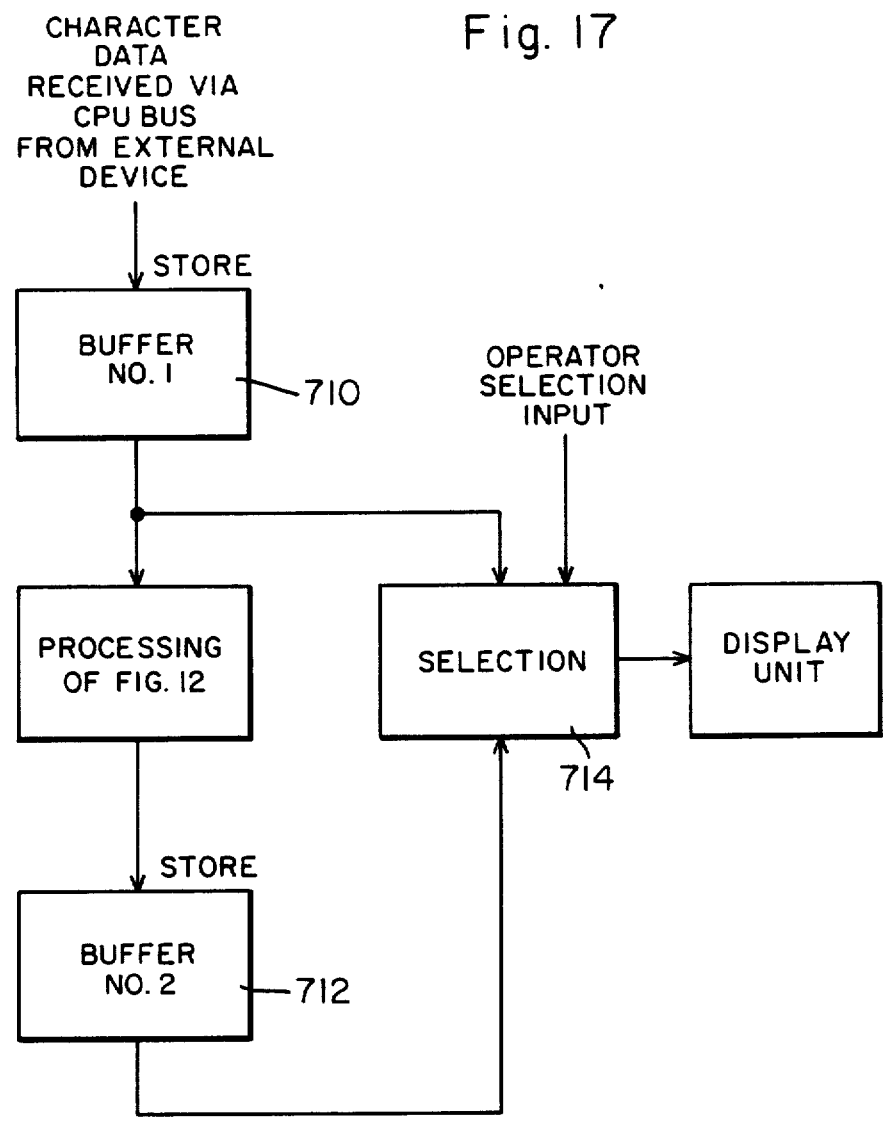
FIG. 17 is a block diagram of a "two display buffer" arrangement in accordance with a preferred embodiment of the present invention.

More specifically, FIG. 17 is a block diagram of a "two display buffer" arrangement to be employed in accordance with a preferred embodiment of the present invention. In operation of such an embodiment, display buffer selection can be achieved either strictly by software or by software control of display buffer selector 714 implemented in hardware. Thus, when code data are received via CPU bus 14, they are first stored in display buffer 710. Then, the code data stored in display buffer 710 are processed according to the processing protocol stated above (see FIG. 12), and the processing results are stored into display buffer 712.

Another operator can then choose display buffer 710 or display buffer 712 from the keyboard via selector 714. When an operator selects display buffer 710, the device displays ASCII characters regardless of the code combination. On the other hand, if the operator selects display buffer 712, the device displays characters such as Hiragana, Katakana or ASCII according to the code stored in display buffer 712. For example, if the code data is as shown in FIG. 14(C), the characters shown in FIG. 14(B) are displayed on the screen when an operator selects display buffer 710, and the characters shown in FIG. 14(A) are displayed when an operator selects display buffer 712. XH or XK, in the character string of FIG. 14(A), are suppressed so as not to be displayed, as described previously.

The functions explained above help an operator to check the original code data which are received as an input. Additionally, the above features render operations more effective and efficient in that the code data stored in display buffer 712 can be automatically amended according to the above-described protocol whenever even one character in display buffer 710 is changed. In addition, since conversion timing is independent of input timing, this arrangement enables a software engineer to provide a more flexible scheme of program-controlling the device.

As shown in FIG. 2, a character with dots (voiced sound) is represented in one character space although the code of the character and the code of the dots are transmitted separately. This is done because patterns of dots attached to characters are registered beforehand in the character generator, and even when dots-to-be-attached characters and dots are transmitted separately, they are represented as one character if special processing (patent applied for separately in Japanese patent application No. 58-040583) is done.

In the above example, the codes transmitted from the host computer are processed so that they may be displayed as characters on the screen of CRT 5. This example is also applied to printing of those codes in the printer 10 of portion 9 shown in FIG. 4.

As shown in the example above, the alphabetic character set is considered the same as the ASCII characters code that has two exceptional characters. The two exceptional characters are the symbols for codes 7C and 7E, "|" and "~", respectively, shown in FIG. 1. These symbols are rarely used, so that no problem will occur if these are replaced by "XH" and "XK", respectively. If character codes are entered into the host computer via this device, "XH" and "XK" codes are added to them automatically. Thus, the number of virtual characters differs from the number of actually entered characters. This problem, however, is solved by using spaces or special marks, etc., as described above.

Next, compatibility with programs created by codes based on ASCII code is discussed.

In programs created by ASCII code, some symbols are often used as codes that can control the flow of programs by themselves. So, if these codes appear unexpectedly, compatibility with conventional programs is lost. For example, in assembling programs, ";" (semicolon) is generally used as the start of a comment statement, and a statement enclosed by { } in a Pascal compiler and a statement enclosed by (  ) in FORTH language are, respectively, assumed to indicated comment statements. In spite of this, digits and alphabetics have no meanings by themselves, but have meanings only as words (character string). For example, END which indicates the end of a program has a meaning only when spaces (or control codes) are assumed both before E and after D. Therefore, if a word, TREND, is used, it is not mistaken for END in the program. If, when three Japanese characters which have the same code numbers as E, N and D, respectively, are entered after the character set is changed over to the Katakana set, the codes are represented by ASCII characters, then they will become END. If, however, the "7E" (hexadecimal) change-over code is attached to the beginning of the word as described above when the character set is changed over to Katakana, it will be ~END in ASCII characters, and thus it will be distinguished from the word END. That is why this system can assume compatibility to be applied mainly to the ASCII code programs.

In the above example, three types of character sets, English Hiragana and Katakana, are used; for the second operational example, the same result will also be assumed if two character sets, consisting of a JIS C 6220 character set and the character set shown in FIG. 15, in which the Katakana part of the JIS C 6220 is replaced by Hiraganas, are used. In this case, however, the code A1 is assumed as the Katakana specifying code (representing by XK), "." (period) equal to the code A1 is replaced by a comma (English), and this part is assumed to be "~" (wave-shaped hyphen) that is a connection symbol in the Hiragana set. If these 8-bit code character systems are used, change-over of character sets can be done only by a change-over code A1 (XK), so it would be much more convenient than that of the 7-bit code systems. Systems adopted to receive the JIS C 6220 code can use both Hiragana and Katakana without changing conventional software and hardware.

In the third operational example, many more character types can be used, even in a 7-bit code system.

In this case, both of the change-over codes "XH" and "XK" used in the first operational example above are replaced by only one code, "XJ". For character strings other than English characters, a code string beginning with "XJ" is assumed using the method shown in the first operational example. In this third operational example, however, codes following "XJ" are significant only when they make a pair in two bytes, respectively. An individual byte is allocated only to the part equal to a digit or alphabetic character as in the first operational example. By performing this, 62×62 alphabetic characters (plus digits), up to 3844 characters, can be represented logically. In addition, the system consists of only code strings not contradictory to conventional programs created by using the ASCII code. Returning of the "XJ"-headed code string to the main character set is done when the space code, symbol code, or control code appears just in the same way as in the first operational example. By using such in the second operational example, texts written in Japanese including Kanjis can be represented.

As exemplified above, this invention allows many types of characters to be input/output easily by using fewer bit character codes. Therefore, texts for which alphabetic characters, Hiraganas and Katakanas are used can be created easily by employing a 7-bit character code system used in many nations in the world. This invention is especially useful in programming. For example, as shown in FIG. 16, the comment statements for programs created by a 7-bit character code system must be created in English. On the other hand, such a statement can be written by using the English-characters-type Japanese spelling system, and it is written only with Katakanas in the JIS C 6220-centered character code system. However, for Japanese people, statements written only with Katakanas are very hard to read. According to this invention, the comment statements written in Japanese are easy to read if written in ordinary Kanji-mixed Japanese. This will not only greatly enhance the efficiency of programming, but also improve the maintenance of the system.

As an example, let us examine the comment statement on the above program list more closely. When a program is created, various software including operating systems, compilers, text editors, etc. are used. Many of these are created on the basis of dealing only with alphabetic characters, digits and symbols within the range of the ASCII code. So, it is impossible to input comment statements in which Hiraganas, Katakanas and alphabetic characters are mixed into present systems. Even for a system that can use the JIS C 6220 code, only alphabetic characters and Katakanas can be used, and thus it is far from being practical.

This is why comment statements have not been widely used for programming in Japan. An English- or Latin-character-type Japanese spelling system is not practical for most Japanese people as yet.

On the other hand, it is generally recognized that the serviceability or maintainability of programs in which comment statements have been omitted is less than the serviceability or maintainability of those which include comments. For example, it often occurs that a program creator finds it very difficult to understand his own programs because no comment statements were attached to the programs. Also, he has to spend much more time to understand program listings made by others.

In Europe or the United States, easy to understand comment statements are used in most programs. This may be because the comment statements are written in their own language. Considering this difference between Japan and Europe or the United States, it is clear how this invention is useful because, by using this invention for a computer or compiler that operates only with 7-bit codes, any comment statements can be written immediately using Hiraganas, Katakanas and alphabetic characters (as shown in FIG. 2), and there is no need to modify the computers and software used so far for implementing this invention.

In addition, no extra cost is required for the manufacturing of the invention since it is almost equal in cost to that required for the manufacturing of conventional equivalent terminals. Therefore, it can exert a great influence on the ability to produce and service programs in Japan.

This terminal also allows ordinary Japanese-like statements to be entered into programs developed in foreign countries, and so it is very useful to promote international exchange in the programming field.

For example, many programs created in Europe or the United States have a HELP function (a computer's menu displaying function to instruct the operator what to do next). Viewing Japanese-made programs from this point, they are inadequate since almost no programs are equipped with functions equal to those of the European or American programs. When using foreign-made programs, the HELP function is not useful for ordinary Japanese since they are in a foreign language. Some attempts have been made to translate the HELP function into Japanese, but these have not been entirely successful, since they were only replaced by Katakanas in conventional systems. Thus, the messages translated into Katakana characters are not used much because they are difficult to read. In addition, many foreign-made programs are created on the basis of a 7-bit code and the shift codes (SI or SO) are already used for another purpose. Thus, it is impossible to translate them into Japanese, or at least it is extremely difficult to translate them. In such a case, the terminal device according to the present invention can be used to display or print out texts mixed with Hiraganas, Katakanas and English characters with no modification of the computer body and programs. Also, this terminal device will be a very useful tool for the coming age in which international exchange in programming will develop further.

While preferred forms and arrangements have been shown in illustrating the invention, it is to be understood that various changes and modifications can be made without departing from the spirit and scope of the disclosure.

I claim:

1. A processing terminal device for receiving character data and processing said character data to obtain processed character data, said device comprising:
   input means for receiving said character data;
   first display buffer means for storing said character data received by said input means;
   processing means connected to said first display buffer means for processing said received character data to provide processed character data;
   second display buffer means for storing said processed character data provided by said processing means;
   selector means operable by the operator for selecting between said first display buffer means and said second received buffer means and display means connected to said selector means for displaying the received character data stored in said first display buffer means or the processed character data stored in said second display buffer means as selected by said selector means.

2. The device of claim 1, wherein said received character data comprises a sequence of input data representing a corresponding sequence of characters, said received character data belonging to any one of a plurality of character sets, each of said character sets having some characters common to each character set and designated by respective common character code data, and wherein one of the character sets is specified as a main set and the other character sets are specified as subsets ;
   said processing means comprising first determining means for determining, with respect to each input datum, whether said each input datum comprises one of said common character code data , and second determining means for determining whether said each input datum comprises a subset-specifying datum specifying one of said subsets;
   said device further comprising specifying register means for storing data specifying any one of said character sets;
   said processing means comprising further means responsive to a determination by said first determining means that said each input datum comprises one of said common character code data for storing, in said specifying register means, data specifying said main set, and for processing said each input datum as a character of the main set ; and
   said further means being further responsive to a determination by said second determining means that said each input datum comprises said subset-specifying datum specifying one of said subsets for further processing the data stored in said specifying register means accordingly to obtain processed data results.

3. The device of claim 2, wherein said second determining means is further responsive to a determination by said first determining means that said each input datum does not comprise one of said common character code data and to a determination that said each input datum does not comprise said subset-specifying datum for determining whether said each input datum comprises a character datum belonging to said main set;
   said further means being further responsive to a determination by said second determining means that said each input datum comprises a character datum belonging to said main set for processing said each input datum to provide datum as an output.

4. The device of claim 2, wherein said second determining means is further responsive to a determination by said first determining means that said each input datum does not comprise one of said common character code data and to a determination by said second determining means that said each input datum does not comprise said subset-specifying datum for determining whether said each input datum comprises a character datum not common to each of said character sets;

said further means being further responsive to a determination by said second determining means that said each input datum comprises a character datum not common to each of said character sets for processing said each input datum in accordance with the data stored in said specifying register means.

5. The device of claim 2, wherein said input means receives, from an external device, an n-bit code comprising said each input datum;

said first determining means using said n-bit code to determine-whether said each input datum comprises one of said common character code data;

said second determining means using said n-bit code to determine whether said each input datum comprises said subset-specifying datum specifying one of said subsets.

6. A processing method for receiving character data and for processing said character data to obtain processed character data, said method comprising the steps of:

(a) receiving said character data;
(b) storing said character data received during step (a) in a first display buffer;
(c) processing said received and stored character data to obtain processed character data;
(d) storing said processed character data in a second display buffer; and
(e) selecting, as a result of an operator input, the contents of the first display buffer or the contents of the second display buffer for display on a display device.

7. The method of claim 6, wherein said received character data comprises a sequence of input data representing a corresponding sequence of characters, said received character data belonging to any one of a plurality of character sets, each of said character sets having some characters common to each character set and designated by respective common character code data, and wherein one of the character sets is specified as a main set and the other character sets are specified as subsets, said method comprising the further steps, between steps (b) and (c), of:

determining, with respect to each input datum, whether said each input datum comprises one of said common character code data;

determining whether said each input datum comprises a subset-specifying datum specifying one of said subsets;

storing, in a specifying register, in response to a determination that said each input datum comprises one of said common character code data, data specifying said main set, and processing said each input datum being processed as a character of the main set; and in response to a determination that said each input datum comprises said subset-specifying datum specifying one of said subsets, further processing the data stored in said specifying register accordingly.

8. The method of claim 7, comprising the further steps, in response to a determination that said each input datum does not comprise one of said common character code data and to a determination that said each input datum does not comprise said subset-specifying datum, of determining whether said each input datum comprises a character datum belonging to said main set; and in response to a determination that said each input datum comprises a character datum belonging to said main set, of processing said each input datum to provide datum as an output.

9. The method of claim 7, comprising the further steps, in response to a determination that said each input datum does not comprise one of said common character code data and to a determination that said each input datum does not comprise said subset-specifying datum, of determining whether said each input datum comprises a character datum not common to each of said character sets; and in response to a determination that said each input datum comprises a character datum not common to each of said character sets, of processing said each input datum in accordance with the data stored in said specifying register.

10. The method of claim 7, wherein said step (a) comprises receiving, from an external device, an n-bit code comprising said each input datum;

said first determining step comprises using said n-bit code to determine whether said each input datum comprises one of said common character code data; and said second determining step comprises using said n-bit code to determine whether said each input datum comprises said subset-specifying datum specifying one of said subsets.

* * * * *